June 24, 1930.                B. MILLER                    1,767,303
                          WIND POWER GENERATOR
              Original Filed April 9, 1927      2 Sheets-Sheet 1
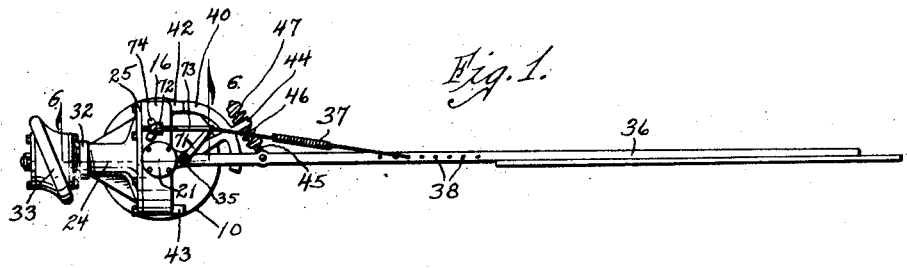
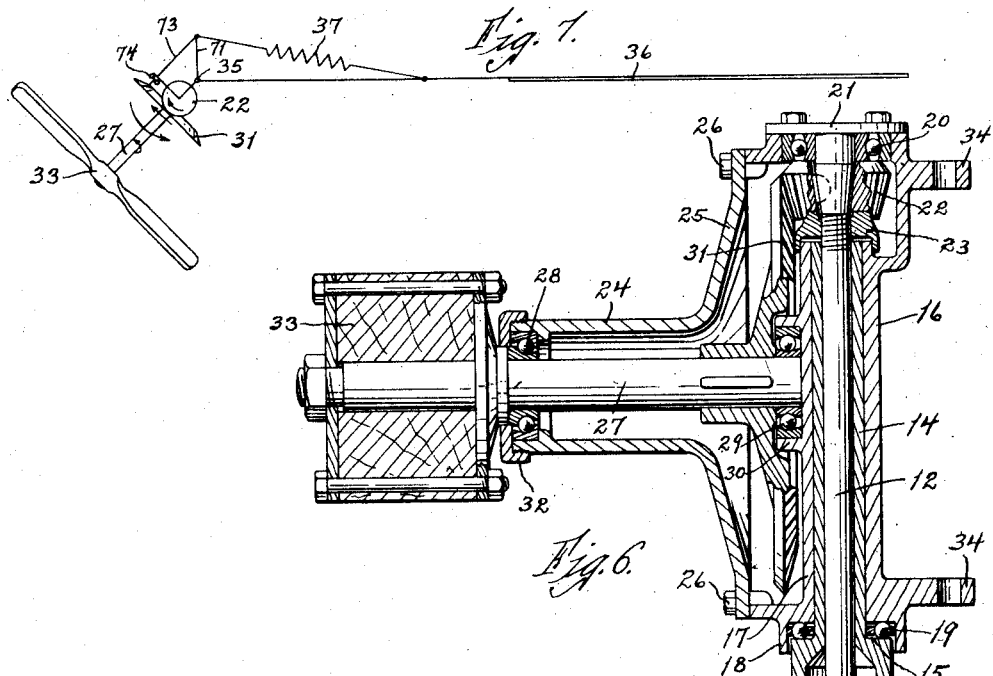
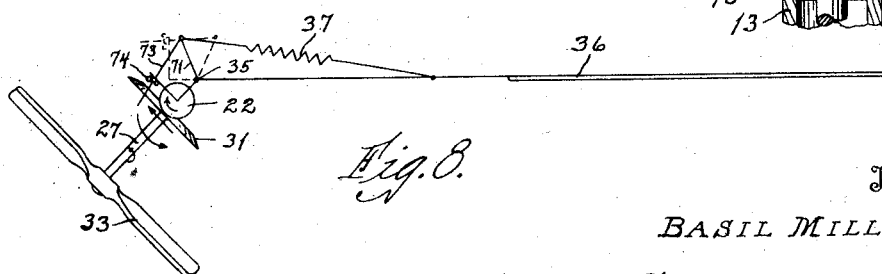
Inventor
BASIL MILLER
By Earl M. Sinclair
Attorney June 24, 1930.   B. MILLER   1,767,303
WIND POWER GENERATOR
Original Filed April 9, 1927   2 Sheets-Sheet 2
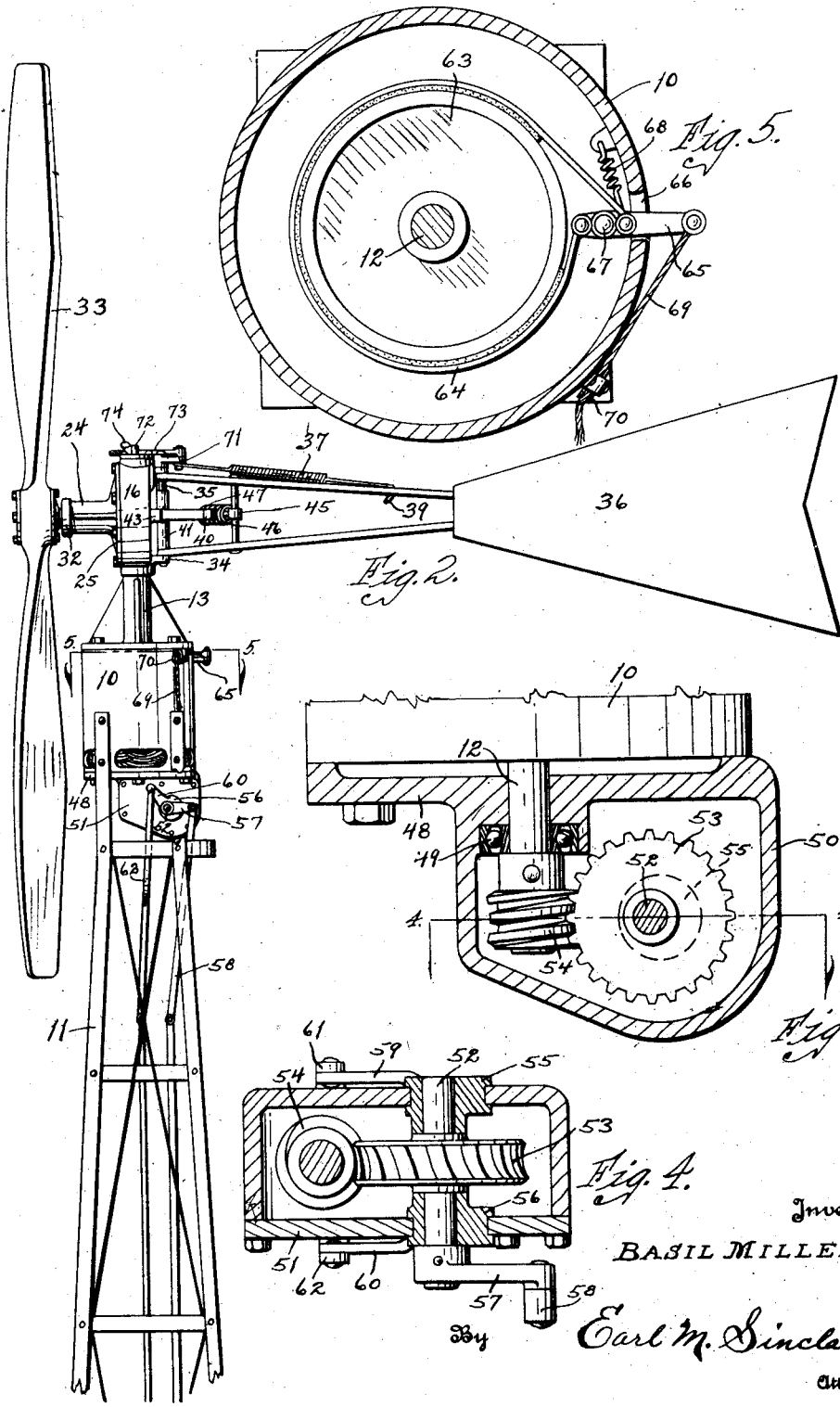
Inventor
BASIL MILLER
By Earl M. Sinclair
Attorney Patented June 24, 1930

1,767,303

UNITED STATES PATENT OFFICE

BASIL MILLER, OF NEWTON, IOWA

WIND-POWER GENERATOR

Application filed April 9, 1927, Serial No. 182,296. Renewed April 21, 1930.

The principal object of this invention is to provide an improved construction for a wind-power generator and particularly to provide simple and efficient means for controlling the speed of the wind wheel irrespective of excessive wind velocities and thereby automatically regulating the charging rate of the generator between certain fixed limits.

More specifically, the object of the present invention is to provide a construction whereby bevel gearing is employed between the driving shaft and the driven shaft and so arranged that the torque of the driving shaft is employed to swing the shaft and the wind wheel out of the face of the wind when the speed thereof reaches a certain maximum point, thereby reducing the speed of the driving shaft and the generator shaft and preventing excessive charging by the generator which might be injurious to the same and to the storage battery.

Another object is to provide novel means for regulating the velocity to which the driving and driven shafts may attain through adjustment of the angularity of pull of the spring means which is employed for normally holding the wind wheel directly into the wind.

Still another object is to provide improved means whereby the generator shaft may be employed for the operation of a mechanical device such as a pump together with improved means for disconnecting such mechanical device from the generator shaft at times.

With these and other objects in view, my invention consists in the construction, arrangement and combination of elements hereinafter set forth, pointed out in the claims and indicated by the accompanying drawing in which—

Fig. 1 is a plan view of my complete apparatus.

Fig. 2 is a side elevation of the same.

Fig. 3 is a vertical section through the casing at the lower end of the generator and illustrating the gearing for operating a pump or the like from the generator shaft.

Fig. 4 is a horizontal section on the line 4—4 of Fig. 3.

Fig. 5 is a horizontal section on an enlarged scale on the line 5—5 of Fig. 2 and illustrating the braking means applied to the generator shaft.

Fig. 6 is a vertical section on an enlarged scale on the line 6—6 of Fig. 1 and illustrating the connection between the driving shaft and the generator shaft.

Fig. 7 is a diagrammatic view illustrating one adjustment of the means for regulating the angle at which the tension means is applied for normally holding the wind wheel into the wind, and Fig. 8 is a similar view showing a different adjustment.

This invention relates to that type of generators which are employed in locations where electric power is not available from ordinary sources and in which the force of the wind is employed for driving a generator to charge a storage battery. In many localities the wind velocity varies a great deal in relatively short periods of time and for this reason it is necessary to provide means to control the speed of the generator and keep it as nearly uniform as possible and particularly to prevent excessive speeds thereof which might be injurious to the generator mechanism and to the battery itself. To meet this difficulty, I have provided a novel means whereby the charging rate may be automatically regulated between certain limits together with means for adjusting the parts so that these limits may be varied to meet particular circumstances.

In the construction of the device as shown, a generator of any suitable type and designated generally by the numeral 10 is mounted on and supported by a tower such as 11 which may be of any suitable height. The generator 10 is arranged with its armature shaft 12 in an upright position and as here shown, projecting at both ends from the main casing of the generator. The upwardly projecting portion of the shaft 12 is inclosed in a tubular housing 13 fixed to and extending upwardly from the generator and formed at its upper portion as a reduced sleeve 14 providing an elongated bearing for the upper end of the shaft, an annular shoulder 15 being provided between the tubular housing 13 and the sleeve 14. A gear housing 16 is mounted on the sleeve 14 and is provided with an elongated vertical bearing 17 which engages and is rotatable on said sleeve. The housing 16 is formed at its lower end with an annular flange 18 which engages loosely the upper end of the tubular housing 13 and a ball bearing assembly 19 is mounted on the shoulder 15 within said flange 18 and serves as an anti-friction support for the gear housing 16 and parts carried thereby. Mounted within the upper portion of the gear housing 16 is a ball bearing assembly 20 which engages the upper end of the armature shaft 12 and is covered by a removable plate 21 on the top of said housing. A bevel pinion 22 is fixed to the upper end of the armature shaft 12 immediately below the bearing 20 and below said pinion is a cap 23 which fits over the upper ends of the sleeve 14 and elongated bearing 17. The forward face of the gear housing 16 is formed with a relatively large opening which is covered by a flanged tubular housing 24, the flange or periphery 25 of said housing being attached to the main gear housing by means of cap screws 26. Mounted for rotation in the tubular housing 24 is the driving shaft 27 which is journaled in ball bearings 28 and 29 carried respectively by the outer end of said housing and by an annular flange 30 formed on one side of the bearing member 17 of the vertical tubular housing 16. Fixed to the inner end of the driving shaft 27 is a large bevel gear 31 which meshes with and is adapted to drive the bevel pinion 22. The outer end of the driving shaft 27 extends through a cap 32 at the outer end of the tubular housing 24 and fixed to the projecting end of said driving shaft is a wind wheel of any suitable type. The wind wheel may be the ordinary type of windmill wheel or it may be a two-blade propeller 33 as here shown.

Formed on the rear side of the gear housing 16 are two vertically spaced ears 34 which are apertured in registry to receive a pin or bolt 35 upon which is pivotally mounted a tail-piece or vane 36 whose function it is to keep the wind wheel facing into the wind in a common manner. It should be noted that the apertured ears 34 and the pivotal point of the vane 36 are in the same vertical plane as the driving shaft 27 and armature shaft 12; and it should also be noted that the bevel pinion 22 which is driven from the bevel gear 31 is located at the upper periphery of said gear.

When the driving shaft 27 is rotated through action of the wind upon the propeller 33, it acts to rotate the armature shaft 12 through the bevel gear connections to the end of operating the generator mechanism and storing electrical energy in a storage battery (not shown), which is placed in any suitable location and has the proper connections with the generator. Any suitable tension means may be employed for normally holding the wind wheel and vane in line so that the wind wheel faces directly into the wind. For this purpose I have shown a retractile coil spring 37 fixed at one end to the vane 36 and at the opposite end to the gear housing 16 in a manner to be described in detail hereafter. The connection of the spring 37 to the vane preferably is adjustable through the provision of a plurality of holes 38 in the frame of the vane adapted for selective engagement by a hook 39 on one end of the spring. Because of the use and arrangement of bevel gearing between the propeller shaft 27 and armature shaft 12, the torque of the propeller or drive shaft tends to throw the wind wheel laterally toward the position indicated in the diagrams of Figs. 7 and 8 and when the velocity of the wind wheel and shaft reaches a certain point this torque overcomes the pulling force of the spring 37 and causes the wind wheel to be swung through an arc to or toward the position shown in Figs. 7 and 8, the gear housing 16 and parts connected therewith pivoting through an arc relative to the vane 36 on the axis of the bolt or pin 35. In such position the wheel is facing angularly relative to the wind and its speed is therefore reduced relative to the wind velocity and by this means excessive speed of the generator shaft 12 is prevented automatically. It is evident that in the swinging movement of the wind wheel and its shaft as described, the bevel gear 31 will roll on the bevel pinion 22 and that this movement is made possible by the utilization of bevel gearing between the driving and driven shafts. It is apparent that a gear ratio between the gears 31 and 22 may be selected whereby there is sufficient torque of the driving shaft to cause this action to occur at approximately a given speed. It is also evident that when the velocity of the wind is lessened materially, the torque will be overcome by the spring 37 and the wind wheel will be returned toward its normal position of facing directly into the wind. It is therefore evident that I have provided an automatic means whereby the speed of the generator shaft and consequently the charging rate is automatically maintained between certain rather definite limits irrespective of excessive wind velocity.

It is desirable to provide cushioning means to absorb the shock caused by movement of the gear casing 16 in either direction and for this purpose I have provided a segmental bumper member 40 which is mounted in a horizontal plane and has a vertically arranged bearing sleeve 41 journaled on the pin 35 between the ears 34. The segmental bumper is adapted to be engaged at its respective ends by blocks 42 and 43 projecting rearwardly from opposite sides of the gear housing 16 when the wind wheel and members carried thereby reach their limit of arcuate movement in either direction. The segmental bumper 40 is formed with a rearwardly projecting apertured lug 44 through which extends loosely a pin 45 pivoted at one end to the frame of the tail-piece 36. Cushioning springs 46 and 47 are mounted on the pin 45 on opposite sides of the lug 44 and serve to cushion the shock of impact of the blocks 42 and 43 against the bumper.

At the lower end of the casing of the generator 10 is mounted a plate 48 which serves as a bearing for the projecting lower end of the armature shaft 12 and preferably carries a ball bearing 49 engaging said shaft. Formed on the plate 48 and projecting downwardly is a gear housing 50 which has a removable plate 51 at one side. Mounted transversely of the gear housing 50 is a countershaft 52 to which is secured a worm wheel 53 meshing with and adapted to be driven by a worm 54 fixed to the lower end of the armature shaft. The countershaft 52 is journaled in eccentric bearings 55 and 56 which are carried by the walls of the housing and which are capable of manipulation to shift the position of the countershaft and carry the worm wheel 53 out of mesh with the worm 54 at times. The countershaft 52 projects from the housing at one end and has a crank arm 57 attached thereto, to which is pivotally connected a jointed pump rod 58 which may be employed for operating a mechanical device such as a pump. The eccentric bearings 55 and 56 have operating arms 59 and 60 formed on and projecting radially from their outer faces and to said operating arms are pivotally connected jointed links 61 and 62 respectively which may be reciprocated manually to rotate the eccentric bearings 55 and 56 and thereby control the position of the countershaft 52 and worm wheel 53.

A means also is provided for controlling the speed of the generator shaft 12 and for stopping it altogether at times, which means is shown in Fig. 5. A drum 63 is fixed to the generator shaft 12 within the casing of the generator and is encircled by a band brake 64 of common form. A brake lever 65 is fulcrumed between its ends in the generator casing and extends through a slot 66 formed in said casing. The band brake 64 is pivotally connected at its respective ends to the lever 65 on opposite sides of the fulcrum 67 thereof so that when said lever is moved in one direction the brake is tightened and when it is moved in the other direction the brake is released. A retractile coil spring 68 is fixed at one end to the brake lever 65 and at the other end to the casing and tends to move said lever in a direction to release the brake. A cable 69 is fixed at one end to the projecting end of the brake lever 65, is rove through a sheave 70 carried by the casing and extends downwardly to a convenient location for manual operation. Draft on the cable 69 results in oscillating the lever 65 and applying the brake 64 to the drum 63 to the end of checking or stopping the rotation of the generator shaft and any suitable means may be provided for holding the cable in position to maintain such brake application.

In the connection of the spring 37 to the gear housing 16, I have provided a means whereby an adjustment may be secured of the position at which, in the swinging movement of the wind wheel and said gear housing, the maximum pulling force of said spring shall be exerted. To accomplish this, a strut 71 is pivoted at one end on the upper end of the bolt 35 and to the other end of said strut the spring 37 is attached. A lug 72 is fixed to and extends upwardly from the gear housing 16 at one side of the longitudinal center of the device and an adjusting link 73 is mounted slidably through said lug and has one end pivotally attached to the strut 71. The other end of the link 73 is threaded and a thumb nut 74 is adjustably mounted thereon and engages the forward side of the lug 72. As the spring 37 is attached at one end to the vane 36 and has its other end supported at a point spaced laterally from the vertical plane of said vane, it is evident that the action of the spring will tend to hold the vane and the propeller shaft 27 in substantial alinement and to return them to such position after having been moved therefrom. It is also evident that the maximum pulling force of the spring 37 will be exerted when the pivoted strut 71 is substantially at right angles to the normal vertical plane of the vane and driving shaft. The thumb nut 74 may be adjusted so that this normal maximum pulling force is exerted when the propeller shaft 27 has moved to any desired angle relative to the plane of the vane, such for instance, as an angle of approximately 45 degrees as indicated in Fig. 7. This adjustment may on the other hand, be made so that the maximum pulling force is exerted before the shaft 27 has passed to the angle above mentioned as is indicated in Fig. 8. In this way, any desired adjustment may be made of the limits within which the charging rate may vary through the automatic regulation accomplished by the arcuate swinging movement of the wind wheel and drive shaft.

An equivalent or somewhat similar result may be obtained by substituting a worm and worm wheel for the bevel gearing between the driving shaft 27 and generator shaft 12.

I claim as my invention:

1. An apparatus of the class described comprising a vertically arranged shaft, a tubular housing inclosing a portion of said shaft and formed with an elongated sleeve and with a shoulder at the base of said sleeve, a gear housing pivotally supported on said shoulder and having a bearing on said sleeve, a bevel pinion fixed to said shaft within said gear housing, a driving shaft arranged at right angles to said vertical shaft and having a bevel gear thereon meshing with said pinion, a wind wheel fixed to said driving shaft, a vane pivotally mounted on the rear side of said gear housing and normally causing said wind wheel to face into the wind, and a spring attached to said vane and to said gear housing and tending to return the latter to its normal position.

2. An apparatus comprising a vertically arranged shaft, a tubular housing inclosing a portion of said shaft and formed with an elongated sleeve and with a shoulder at the base of said sleeve, a gear housing pivotally supported on said shoulder and having a bearing on said sleeve, a bevel pinion fixed to said shaft within said gear housing, a driving shaft arranged at right angles to said vertical shaft and having a bevel gear thereon meshing with said pinion, a wind wheel fixed to said driving shaft, a vane pivotally mounted on the rear side of said gear housing and normally causing said wind wheel to face into the wind, a strut pivotally attached to said gear housing, a spring attached at one end to said vane and at the opposite end to said strut, and adjustable means for holding said strut in a given position of angularity relative to the vertical plane of said driving shaft.

3. An apparatus of the class described, comprising a vertically arranged shaft, a gear housing arranged for rotatable adjustment about the axis of said shaft, a bevel pinion fixed to said shaft within said gear housing, a driving shaft arranged at right angles to said vertical shaft and having a bevel gear thereon meshing with said pinion, a wind wheel fixed to said driving shaft, a vane pivotally mounted on the rear side of said gear housing and normally causing said wind wheel to face into the wind, a strut pivotally attached to said gear housing, a spring attached at one end to said vane and at the opposite end to said strut, and adjustable means for holding said strut in a given position of angularity relative to the vertical plane of said driving shaft.

4. An apparatus of the class described, comprising a vertically arranged shaft, a gear housing arranged for rotatable adjustment about the axis of said shaft, a bevel pinion fixed to said shaft within said gear housing, a driving shaft arranged at right angles to said vertical shaft and having a bevel gear thereon meshing with said pinion, a wind wheel fixed to said driving shaft, a vane pivotally mounted on the rear side of said gear housing and normally causing said wind wheel to face into the wind, a strut pivotally attached to said gear housing, a spring attached at one end to said vane and at the opposite end to said strut, a lug on said gear housing, an adjusting link pivotally attached to said strut and having one end extending slidably through said lug and threaded, and a member adjustably mounted on the threaded end of said link in engagement with said lug for holding the strut in a given position of angularity relative to the vertical plane of said driving shaft.

BASIL MILLER.